United States Patent [19]

Pearson

[11] Patent Number: 4,516,853

[45] Date of Patent: May 14, 1985

[54] LASER RADAR ADAPTIVE TRACKING SYSTEM

[75] Inventor: James E. Pearson, North Palm Beach, Fla.

[73] Assignee: United Technologies Corporation, Hartford, Conn.

[21] Appl. No.: 364,138

[22] Filed: Mar. 31, 1982

[51] Int. Cl.³ .................. G01B 11/26; G01C 1/00; G01J 1/20
[52] U.S. Cl. .................. 356/152; 250/201; 250/203 R; 332/7.51; 356/5; 356/141
[58] Field of Search .............. 250/201, 203 R; 356/5, 356/141, 152; 332/7.51; 455/603, 608

[56] References Cited

U.S. PATENT DOCUMENTS

| 3,603,686 | 9/1971 | Paine et al. | 250/203 R |
| 3,825,340 | 7/1974 | Debart | 356/5 |
| 3,967,899 | 7/1976 | O'Meara | 356/5 |
| 4,096,380 | 6/1978 | Eichweber | 455/603 |
| 4,215,936 | 8/1980 | Winocur | 356/5 |
| 4,401,886 | 8/1983 | Pond et al. | 250/203 R |

Primary Examiner—S. C. Buczinski
Attorney, Agent, or Firm—Eric W. Petraske

[57] ABSTRACT

A laser radar system employs an acousto-optic modulator to sweep an output beam. Comparison of reflected radiation with output radiation permits adaptive control of steering angle and beam width to track a target with efficient use of power.

5 Claims, 4 Drawing Figures

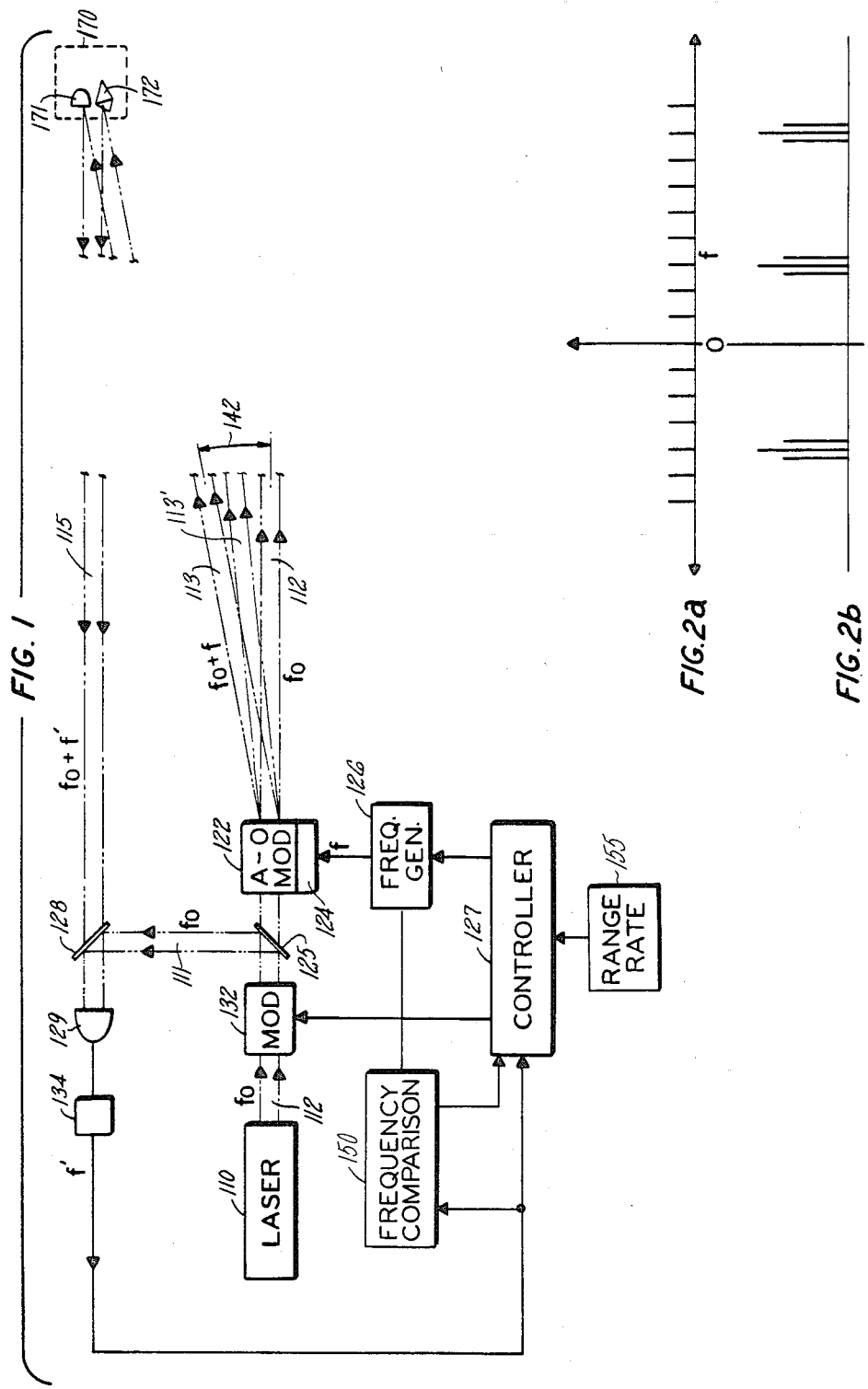

LASER RADAR ADAPTIVE TRACKING SYSTEM

TECHNICAL FIELD

The field of the invention is that of a frequency-swept laser radar system for acquisition, tracking or guidance and identification of multiple targets.

BACKGROUND ART

In a laser radar system, the radar beam is swept across a field by a number of means, such as a pair of rotating optical wedges, a rotating mirror or an acousto-optical modulator, which receives a variable signal to modulate the frequency of the laser beam to produce a sweeping action that depends on the frequency of the modulator compared to the output beam. Any of these systems may be used in a scanning mode in which return signals are correlated with the nominal angle at which the beam was directed when the return signal was received; or they may be used in a tracking mode in which a previously acquired target is followed by controlling the beam steering device in order to maintain the target return signal on a detector. As a particular example, the return signal from a target may strike a quadrant optical detector and the signals from that detector may be used to control the beam steering device in order to maintain the return signal centered on the detector.

A specialized application of a laser is used in a beam rider missile guidance system, in which a broad laser beam is directed at a target and the beam is spatially encoded so that a missile within the beam can receive and decode the laser beam to determine its position relative to the center of the beam. In such systems, the laser beam does not return to the origin so that it is not a radar system but rather a transmitting system. U.S. Pat. Nos. 4,245,800 and 4,215,324 illustrate different forms of such a system in which a fixed laser beam is spatially coded for the purpose of giving position information to a missile which is within the laser beam.

U.S. Pat. No. 4,227,261 discloses a system in which a pair of laser beams are swept mechanically by means of a rotating wedge system to impinge upon one among a number of bodies within the space swept out by the beams. The system locates the body within a defined space, directs a laser beam toward the body and transmits information to it. The system locates the bodies within the space by means of radiation reflected back to the origin.

DISCLOSURE OF INVENTION

The invention relates to a laser radar system in which the radar laser beam is swept over an angular range by means of acousto-optic modulation to scan a field of view and to acquire a target. Once a target is acquired, the return signal from the target is frequency analyzed to provide an independent measurement of the angular position of the target, so that the frequency spectrum with which the beam is steered may be reduced in width and a corresponding increase in power delivered to the target may be obtained.

Another feature of the invention is that frequency analysis of the return signal provides a means of controlling the frequency which is used to sweep the beam in order to provide a real-time adaptive correction of the field of view of the beam and the correct angular position at which the beam is directed.

Another feature of the invention is the modulation of the beam in order to transmit commands to a target which has been acquired.

BRIEF DESCRIPTION OF DRAWING

FIGS. 1 and 3 illustrate in schematic form embodiments of the invention;

FIGS. 2a and 2b illustrate a frequency spectrum used to steer the beam both in the scanning mode and in a tracking mode.

BEST MODE FOR CARRYING OUT THE INVENTION

Figure 3:
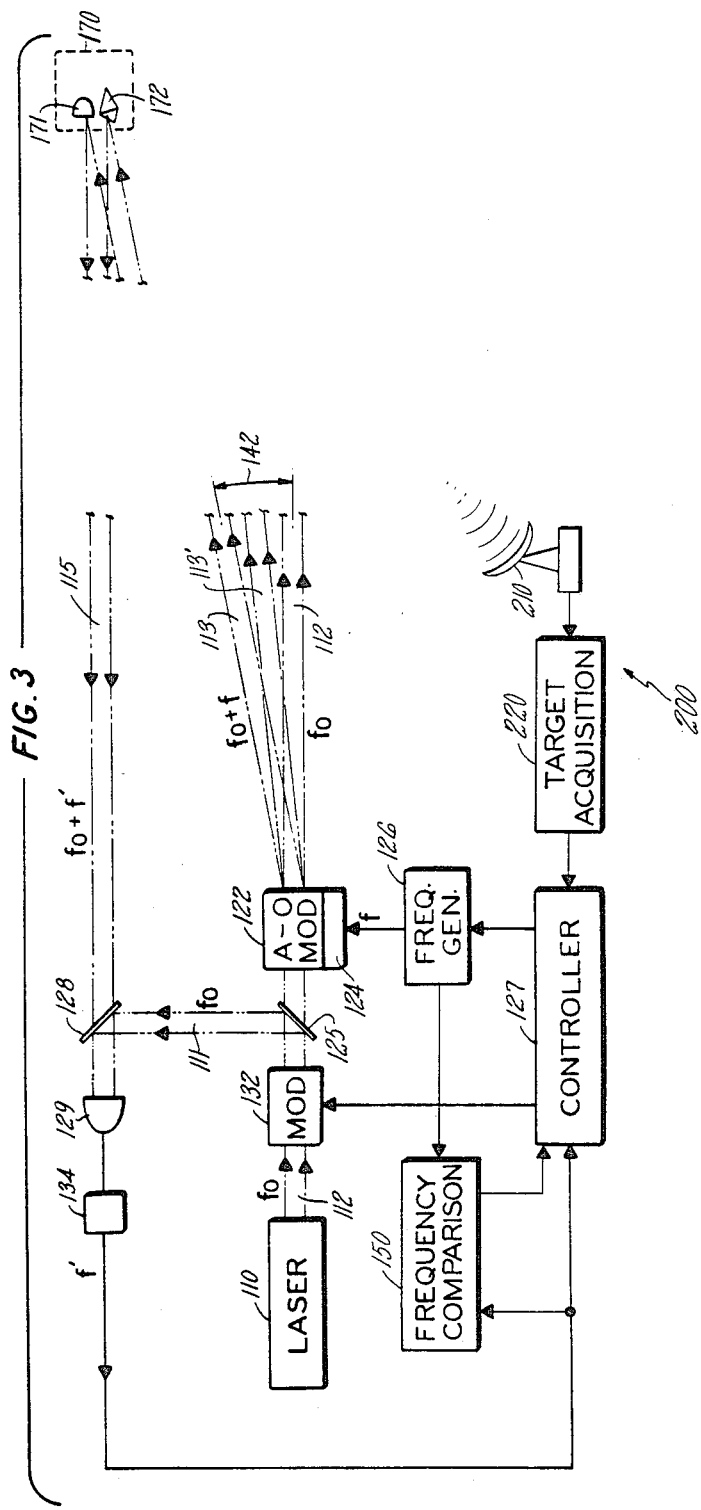

In FIG. 1, laser 110, which may be a $CO_2$ laser or any other convenient laser, generates laser beam 112 which passes through modulator 132 discussed below, through beamsplitter 125 and through acousto-optic modulator 122. Within modulator 122, beam 112 passes through a piece of material such as germanium or any other convenient material for the process. As it passes through, it encounters a temporary diffraction grating formed by the effect of a soundwave which is transmitted into the modulator by means of acoustic transducer 124. Transducer 124 receives a signal at frequency f which may be in the range of tens of megahertz, from frequency generator 126 which contains conventional oscillators and amplifiers to generate signals in at least two frequency ranges as shown in FIG. 2b. The value of frequency f is selected such that the wavelength of sound within the crystal has a certain magnitude to form a temporary diffraction grating by means of oscillation of the molecules of the crystal, which grating directs beam 112 into a new direction. The optical output from modulator 122 consists of the original beam 112, somewhat diminished in intensity, and a new sub-beam 113 at an angle 142 from the original direction and having a frequency $f_0+f$. The angular difference 142 is determined by the relationship between the wavelength of light at frequency $f_0$ and the wavelength of sound within the acousto-optic crystal. The interaction of the light beam with this temporary diffraction grating also changes the frequency of the light to a new value $f_0+f$ associated with the direction of beam 113. Each direction will be associated with a different value of f, so that the frequency defines the angle at which the beam is deflected. For simplicity, this system is shown in a single dimension, the beam being deflected in the plane of the paper. Those skilled in the art will easily be able to extend the principles of the invention to a two dimensional deflection, either by putting two transducers on a single crystal or two crystals in series.

Beam 113 strikes target 170, which contains detector 171 and retroreflector 172. Reflector 172 reflects back a second beam, indicated as beam 115 in the figure, which is detected by detector 129. Detector 171 receives the beam at frequency $f_0+f$, demodulates signals carried by it and passes modulation signals to circuits within target 170. Target 170 may be, for example, a missile which is being controlled by commands from the ground The location of the point toward which the missile 170 is being directed may come from any conventional source, such as a conventional RF radar 200 having an antenna 210 and electronics module 220 or an operator-controlled sight that is used to indicate a target. No novelty is claimed for such conventional methods of target acquisition. Modulation is imposed upon beam 112 in modulator 132 controlled by controller circuits 127. Any form of modulation known to those skilled in the art may be employed, such as pulse code modulation, achieved by known techniques such as selectively transmitting signals from a mode-locked laser.

The return beam from reflector 172 has a frequency $f_0+f'$ which is slightly different from the frequency $f_0+f$ of beam 113 because beam 115 has a frequency that is doppler-shifted as a result of the velocity of target 170. Beam 115 is combined in beamsplitter 128 with beam 111, which has frequency $f_0$ and is deflected from beam 112 by beamsplitter 125. Beams 111 and 115 interfere in detector 129 to produce a beat frequency at frequency $f'$. Frequency $f'$, an RF frequency in the range of tens of megahertz, emits from circuits 134 responsive to detector 129 and is returned to controller 127. A conventional frequency counter and comparison unit 150 measures the frequency $f'$ and transmits the information to controller 127.

With this closed loop system, it is possible not only to provide a real-time correction of the direction of target 170, and hence of the frequency f that should be applied to direct beam 113 at the target, but also to measure the velocity of target 170 by comparison of frequency $f'$ and frequency f.

The closed loop aspect of the system permits the controller 127 to adapt frequency f to accommodate a change in target position in time shorter than would be the case if a rotating wedge system were used to track the target as would be conventional in the prior art.

Once a target has been acquired, it is not necessary to sweep the beam across angles where there is no target and therefore the power applied to the modulator may be concentrated for those frequencies which correspond to angles of interest. In real systems which must operate in the field, there is always a limitation of size and weight and, therefore, of power. It is therefore advantageous to be able to concentrate power on a target, especially since it is known that a target being controlled from a ground station may have a signal strength that varies by as much as 120 decibels over the course of the target's path. Since the frequency generated by generator 126 is not perfect and since there will be some drift in the frequency and some motion of the target, it would not be advisable, even if it were possible, to make the beam extremely narrow. Therefore, the frequency f actually represents a range of frequencies. In FIG. 2a, a graph showing amplitude as a function of frequency f is shown, in which relatively small signals are spaced uniformly in frequency, corresponding to an appropriate frequency spectrum used for scanning. FIG. 2b illustrates a frequency spectrum appropriate for the tracking of three targets which have previously been acquired. In this case, three higher-strength signals are contained in groups of three. As the target 170 moves in angle the position of the centroid of each group will be changed, of course, under the direction of controller 127. It may also be advantageous to use a different frequency spacing in these groups of three from the spacing used in the scanning mode.

The foregoing advantages of a laser radar system which analyzes the frequency of the return signal may be achieved whether the laser is cw or pulsed. Further advantages may be achieved if the beam is pulsed. In particular, range information may be derived from the time of flight to the target and back; and the rate of change of range may be derived by storing a previous range and comparing it with the next one in conventional electronics indicated by block 155. Similarly, a stored measurement of the frequency may be compared to derive not only the present angular position of the target but also its rate of change. The switching of the beam to achieve time dependent information may be achieved by means of modulator 132 which may also apply modulation (either am or pulsed code modulation) for the purpose of transmitting guidance signals. Those skilled in the art will recognize that different types of modulation, electro-optic or acousto-optic may be used to modulate the beam. For example, an electro-optical modulator may be used with a Brewster angle plate to dump selected pulses from a mode-locked laser or, by rotating the plane of polarization, to amplitude modulate the beam.

The use of guidance signals and of guiding target 170 is, of course, restricted to friendly targets, such as missiles which are being controlled from a ground station. The same system may be used in detecting hostile targets if the back-scattered signal from the target is sufficiently strong. In the case of weak signals, the use of coherent heterodyne detection such as is illustrated in the figure will improve the signal-to-noise ratio considerably.

I claim:

1. An adaptive laser system for tracking a target comprising:
    a laser for generating an output beam,
    signal-generating means for generating a control signal containing a plurality of frequencies,
    acousto-optical means responsive to a control signal containing a plurality of control frequencies having control signal frequency amplitudes for steering a portion of said output beam to form a steered beam directed at said target,
    transducer means adjacent to a first side of said acousto-optical means, for coupling simultaneously at least two frequencies of said plurality of frequencies into said first side of said acousto-optical means, so that said steered beam comprises simultaneously at least two steered sub-beams, each of which steered sub-beams is steered in a direction depending on one of said at least two frequencies,
    detector means for receiving radiation reflected from said target, and
    control means for controlling said acousto-optical means by increasing selected ones of said control signal amplitudes of said control signal frequencies, whereby said steered beam is increased in power.

2. A laser system according to claim 1, in which said steered beam has a steered output frequency dependent on the angle at which it is steered; in which said detector means includes means for measuring the frequency of said reflected radiation; and in which said control means adjusts said selected ones of said control signal amplitudes in response to said frequency of said reflected radiation, whereby said steered beam is adaptively directed at said target.

3. A laser system according to claim 2, further comprising modulator means for modulating said steered beam in response to signals from said control means, whereby guidance commands may be transmitted to said target along said steered beam.

4. A laser system according to claim 2, in which said output beam is pulsed and said control means contains means for measuring the time between transmission of a steered beam pulse and reception of reflected radiation from said steered beam pulse, whereby range and range rate of said target may be determined.

5. A laser system according to claim 2, in which said steered frequency and said frequency of said reflected radiation are compared to determine the velocity of said target from the doppler shift of said reflected radiation.

\* \* \* \* \*